United States Patent [19]

Newman

[11] Patent Number: 5,230,537
[45] Date of Patent: Jul. 27, 1993

[54] PIPE COUPLING

[75] Inventor: Christopher Newman, Telford, England

[73] Assignee: Glynwed Consumer & Building Products Limited, Telford, England

[21] Appl. No.: 836,951

[22] Filed: Feb. 19, 1992

[30] Foreign Application Priority Data

Feb. 23, 1991 [GB] United Kingdom ............... 9103845

[51] Int. Cl.⁵ ............................................. F16L 17/04
[52] U.S. Cl. ................................... 285/112; 285/337; 285/373; 285/410; 285/910; 24/279; 277/207 A; 277/101
[58] Field of Search ............... 285/110, 112, 337, 373, 285/367, 410, 910; 24/279 X; 277/207 A, 207 R, 101

[56] References Cited

U.S. PATENT DOCUMENTS

| 2,041,132 | 5/1936 | Johnson | 285/112 |
| 2,377,510 | 6/1945 | Newell | 285/373 |
| 2,795,439 | 6/1957 | Smith | 285/110 |
| 2,936,186 | 5/1960 | Dunmire | 285/373 |
| 3,010,172 | 11/1961 | Kaplan | 285/367 |
| 3,153,550 | 10/1964 | Hollett | 285/373 |
| 3,235,293 | 2/1966 | Condon | 285/367 X |
| 3,329,446 | 7/1967 | Katis et al. | 285/373 |
| 3,460,788 | 8/1969 | Goldman | 24/279 |
| 3,479,066 | 11/1969 | Gittleman | 285/373 |
| 3,544,137 | 12/1970 | Contreras et al. | 285/367 X |
| 3,861,723 | 1/1975 | Kunz et al. | 285/410 |
| 4,045,060 | 8/1977 | Daigle | 285/369 |
| 4,417,755 | 11/1983 | Gittleman | 285/373 |
| 4,468,842 | 9/1984 | Perry et al. | 24/279 |
| 4,502,189 | 3/1985 | Sieberkrob et al. | 285/373 |
| 4,664,428 | 5/1987 | Bridges | 285/373 |
| 4,893,843 | 1/1990 | De Raymond | 285/112 |
| 4,898,407 | 2/1990 | Zeidler | 285/328 |
| 5,056,196 | 10/1991 | van Walraven | 24/279 |

FOREIGN PATENT DOCUMENTS 54-7424 10/1957 Canada ........................... 285/112

Primary Examiner—Eric K. Nicholson
Assistant Examiner—Heather Chun
Attorney, Agent, or Firm—Spensley Horn Jubas & Lubitz

[57] ABSTRACT

A pipe coupling comprising a sealing gasket to fit over adjacent ends of pipes to be connected end-to-end and a housing which clamps around the gasket, has the housing in the form of a cast metal or alloy band which substantially encircles the gasket and has at its circumferential ends opposed lugs between which a wedge portion of the gasket extends and which are connected by at least one clamping bolt engaged with retaining means, whereby the lugs can be urged towards one another to contract the band onto the gasket. The lugs grip the wedge portion as the band is contracted and prevent the body of the gasket from bulging outwardly between the lugs. Preferably the band is made of a ductile metal or alloy, e.g. ductile iron, and is slightly oval in its free state so that it assumes a substantially true circular form when fully contracted onto the gasket.

5 Claims, 2 Drawing Sheets

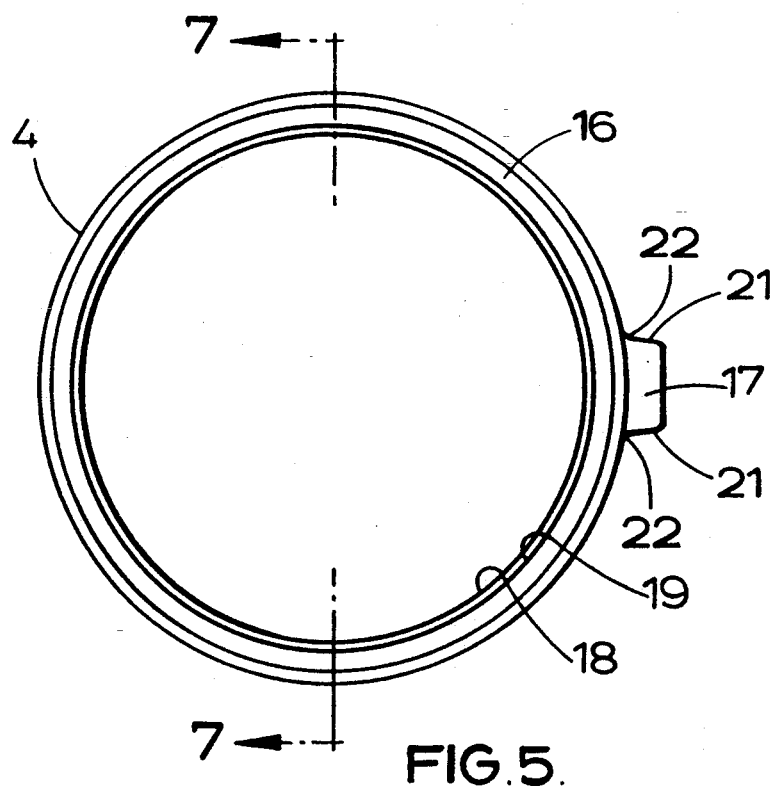
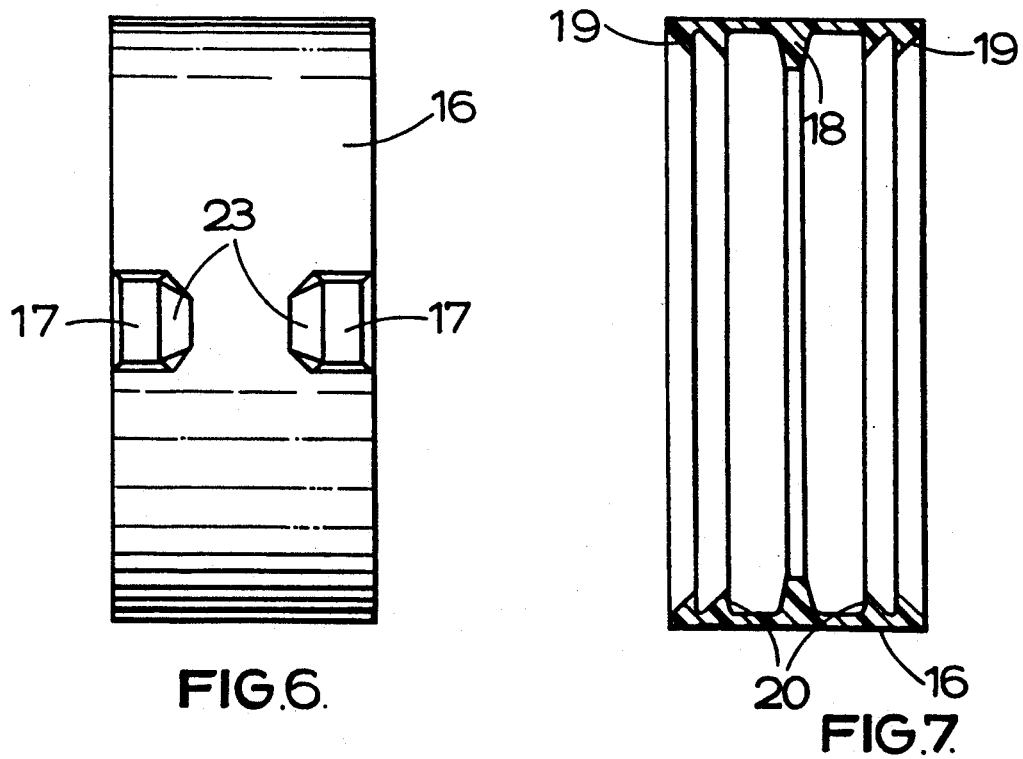

PIPE COUPLING

This invention relates to a pipe coupling for connecting two pipes or conduits together end-to-end and comprising an annular sealing gasket which fits as a sleeve over the adjacent end portions of the pipes or conduits to be connected and is encompassed by a housing which clamps about the gasket and pipe ends to secure the connection.

In general the housings of such pipe couplings for connecting together drainage pipes, soil pipes and the like are made as metal pressings, for example of stainless steel, or as castings, for example of cast iron. The pressed metal housings commonly take the form of a band which encircles the sealing gasket and has two opposed clamping flanges or lugs at its circumferential ends connected by one or more clamping bolts or screws which are tightened in retaining nuts, or threaded holes of the flanges or lugs, to contract the band about the sealing gasket. Those housings which are formed as castings, on the other hand, have hitherto been two-part clamps comprising two complementary rigid, part-circular members each having radially outwardly directed lugs at their opposite ends at which the members are connected together, at diametrically opposite sides of the pipes or conduits to be connected, by clamping bolts or screws which are tightened in retaining nuts to draw the members together about the sealing gasket. There may be one or two clamping bolts at each connected pair of lugs. The fact that there are two pairs of connected lugs inevitably makes the connections between the two members rather conspicuous at the joint where the coupling is used. This can be aesthetically undesirable in some pipework or conduit installations, as for example at exposed external down pipes from roof gutterings of buildings. Furthermore, the need for a clamping bolt or bolts at two pairs of lugs to connect the members adds to the time required to fit and secure the coupling for use.

The present invention provides a pipe coupling which has a cast housing but which may be fitted more readily than the known two-part cast housings, and which may be more aesthetically acceptable when it is fitted for use.

According to the present invention a pipe coupling is provided which comprises a sealing gasket and a housing, the sealing gasket having an annular body adapted to be fitted in use as a sleeve over the adjacent end portions of two pipes or conduits to be connected end-to-end by the coupling, and a wedge formation projecting radially outwardly from the external circumferential surface of the body, and the housing being in the form of a band which contains and substantially encircles the sealing gasket, is a casting of metal or alloy and has a pair of opposed, radially-outwardly directed lugs at the circumferential ends of the band which are connected by at least one clamping bolt located with respect to and extending between the lugs and engaged with retaining means such that by tightening the engagement between the bolt and retaining means the lugs can be urged towards one another to cause the band to be contracted on to the sealing gasket, the wedge formation of the gasket extending between the opposed lugs and being adapted to be gripped by the lugs such as to restrain the body of the gasket from bulging outwardly between the lugs when the band is contracted on to the gasket.

By restraining bulging of the gasket between the lugs a secure circumferential sealing engagement of the gasket on the pipes or conduits to which the coupling is applied for use is ensured.

Preferably the band is of a ductile metal or alloy, for example a ductile iron. Other suitable metals or alloys may be used which have some inherent resilience.

The band may be formed to be slightly oval in its free state, the longer diameter being transverse to the direction in which the lugs extend from the band, and the extent of the ovality being such that when the band is fully contracted on to the gasket it assumes a substantially true circular form. In this way the body of the gasket is compressed evenly about the pipes or conduits as the band is contracted so that a sound circumferential sealing engagement with the pipes or conduits is achieved.

Preferably the band is at least as long axially as the sealing gasket so that the gasket is contained within the axial length of the band. There may be internal peripheral retaining bead formations at the axially opposite ends of the band which co-operate with the axially opposite ends of the body of the gasket to locate the gasket in the band and hold it in place for fitting of the coupling for use, and also to retain the ends of the body inside the band as the band is contracted on to the gasket. Where such bead formations are provided they should be interrupted at the portion of the band diametrically opposite to the lugs in order not to restrict the contraction of the band.

Continuous peripheral bead formations may be provided on the exterior of the band, if desired, for example for decorative effect, without unduly restricting the contraction of the band. This is because such formations will be under tension as the band is contracted which can be more readily accommodated, whereas the internal retaining bead formations will be under compression.

The clamping bolt may be located in holes formed, as by drilling, in the lugs. One lug may have a threaded hole which provides the retaining means with which the bolt engages. Another arrangement which generally may be more convenient is for the retaining means to be a nut or comparable retaining element with which the clamping bolt engages. In such an arrangement the bolt may be located in plain bore holes in the lugs, or in a plain bore hole in one of the lugs and a slot in the other. Preferably however, slots which open to the radially outer ends of the lugs are provided in the lugs to locate the bolt, and are defined in the lugs as the band is cast. The slots simplify the application of the bolt to the lugs as it can be inserted sideways into the slots, with the nut or other retaining element already fitted to it if desired. They also simplify production in that no work is required on the lugs subsequent to the band's having been cast to enable them to accept the bolt. One of the lugs may have a recess formed in it, again during casting, to receive at least part of the head of the bolt and mate with the head in such a manner as to restrain the bolt from turning as the nut or element is tightened, or slackened, on the bolt. Alternatively a recess may be provided to receive at least part of the nut or element and restrain it from turning as the bolt is turned. Just one tool need be used, therefore, to tighten or slacken off the engagement of the bolt with the nut or element, as the case may be. The head of the bolt may have a kerf for a screwdriver and/or flats for engagement by a spanner or wrench.

When slots are provided for the clamping bolt the lugs are preferably inclined relative to one another so that they diverge outwardly from the band. The arrangement assists in retaining the bolt head and nut or other retaining element securely in engagement with the lugs as the band is contracted on to the gasket.

There may be more than one clamping bolt at the lugs. If there is more than one clamping bolt there may be more than one pair of the lugs spaced apart in the axial direction of the band, one pair for each clamping bolt. In such an arrangement the sealing gasket may have a separate wedge formation for each pair of lugs.

In one embodiment of the coupling in accordance with the present invention the band has a central internal annular recess, in the form of a groove or channel, which has the effect of concentrating towards the opposite axial ends of the gasket the compressive forces which are exerted on the gasket, and thereby enhancing the sealing engagement of the end portions of the gasket with the pipes or conduits being connected.

Conveniently the band is cast in ductile iron. It may be cast in a range of ductile iron grades, for example 600/3-420/12, to suit the size and intended application of the coupling.

The gasket may be made of natural or synthetic rubber or a suitable plastics material. It may have a central internal annular rib against opposite sides of which the end edges of two pipes or conduits to be connected abut when the gasket is correctly positioned on the ends of the pipes or conduits. There may also be one or more internal annular sealing ribs spaced to either side of the central rib which sealingly engage with the external circumferential surfaces of the pipes or conduits.

When the gasket has an internal annular rib for the end edges of pipes or conduits to be connected to abut against, the provision of the aforementioned internal annular recess in the band has the additional effect of reducing compression on the central region of the gasket opposite the rib. This ensures that the lug does not expand inwardly into the bore area of the connected pipes or conduits under the compressive loading of the clamp.

The or each wedge formation may be of truncated triangular cross-section. Preferably the or each wedge formation merges into the body of the gasket in a concave curve at each of its flanks. The inner ends of the lugs may be complementally curved for engagement with the concave curves of the wedge formation or formations, or they may be dissimilarly curved, preferably with a larger radius of curvature. It is possible that the cross-section of the or each wedge formation may be bifurcated to some extent at least towards its radially outer end to increase its compressability between the lugs. The or each wedge formation is conveniently radially shorter than the lugs and stops short of the clamping bolt or bolts. It would be possible, however, for the or each wedge formation to have an aperture or recess in it through which the or each clamping bolt passes. Preferably the annular spacing apart of the opposed lugs of the band when the band is uncontracted and the thickness of the or each wedge formation annularly of the gasket are such that the lugs abut against or bear on the wedge formation or formations before the band is contracted.

In a preferred embodiment, as an aid for the fitter to know when the coupling is properly secured for use, the opposed lugs are arranged to make abutting contact with one another when the desired extent of contraction of the band on the gasket has been achieved to ensure sound sealing engagement of the gasket on the pipes or conduits being connected.

An embodiment of the invention will now be described by way of example only with reference to the accompanying drawings in which:

FIG. 5 is an end view of a sealing gasket of the coupling;

FIG. 6 is a front view of the gasket; and

FIG. 7 is a section on line 7—7 of FIG. 5.

Figure 1:
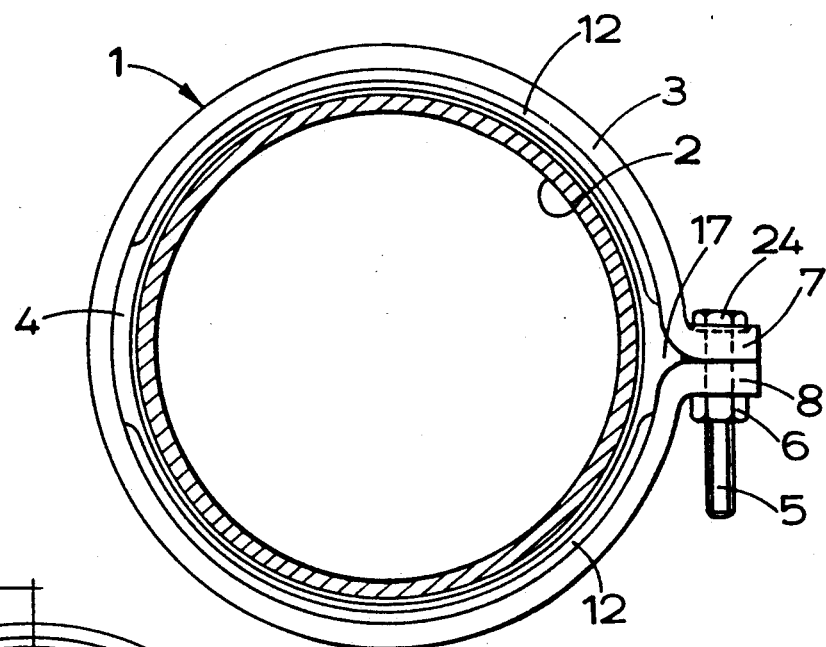
FIG. 1 is an end view of a pipe coupling in accordance with the invention fitted for use.

As shown in FIG. 1 of the drawings, a pipe coupling 1 is fitted for use on the end portions of two pipes 2, only one of which as shown, of similar diameters which are connected co-axially end-to-end. The coupling 1 comprises a band 3, a sealing gasket 4, a clamping bolt 5 and a retaining nut 6.

The band 3 is a casting of ductile iron. For the coupling to be used for connecting pipes of 100 mm external diameter the band typically is made of a ductile iron which is capable of at least 3% elongation before permanent deformation occurs under a tensile load. The band is axially a little longer than the sealing gasket 4 and it extends through most of a complete circle, typically approximately 340°. Its circumferential ends are formed into two opposed, outwardly-extending, radial lugs 7, 8. At their inner ends 7', 8', FIG. 2, the facing surfaces of the lugs 7, 8 are convexly curved arcuately to merge into the inner circumferential surface of the band. Side edges of the lugs are arcuately curved inwardly towards the outer ends of the lugs. A slot 9, 10 is formed centrally in each lug 7, 8 during casting and opens to the outer end of the lug. A hollow 11 is formed around the closed end of the slot 9 in the one lug 7.

In its free state the band is slightly oval, its major diameter being transverse to the direction in which the lugs 7, 8 extend from the band. Typically for application of the coupling to pipes having an external diameter of 100 mm the major diameter of the oval at the interior of the band is 124 mm and the minor diameter is 121 mm. In that band the curvature of the interior containing the minor diameter has a radius of 63.5 mm and the curvature containing the major diameter has a radius of 61 mm. The lugs extend radially of the central axis of band so that they diverge outwardly away from one another.

Figure 2:
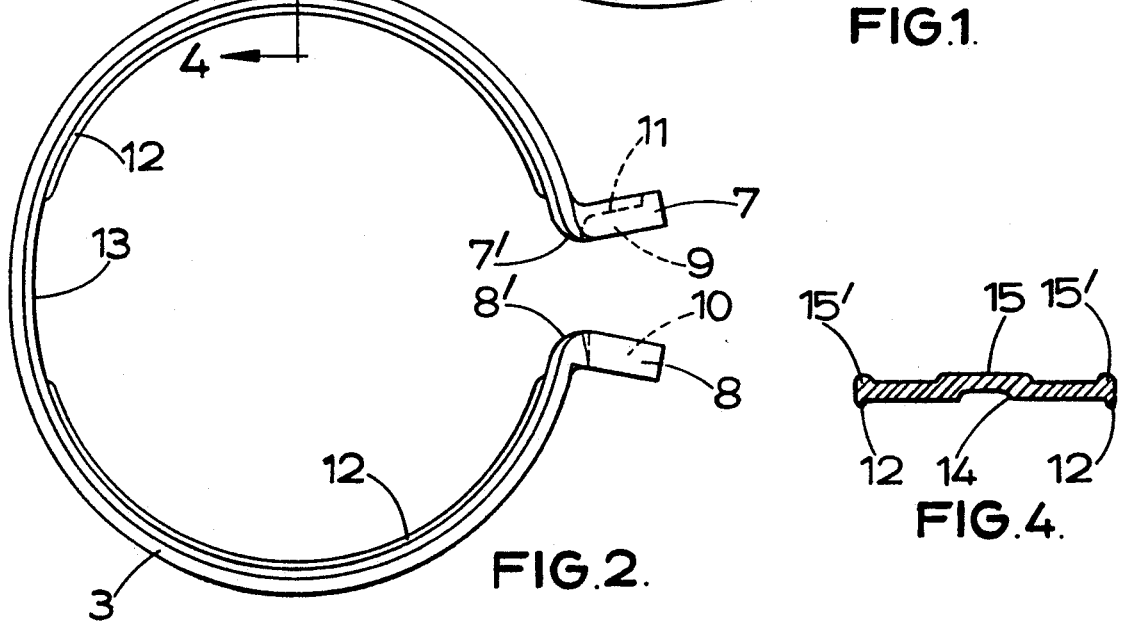
FIG. 2 is an end view of a band of the coupling.

At its axially opposite ends the band has circumferential retaining beads 12 on its internal surface which are interrupted at portions 13 of the band, FIG. 2, diametrically opposite to the lugs 7, 8 so as not to restrict the compressive flexibility of the band.

Figure 4:
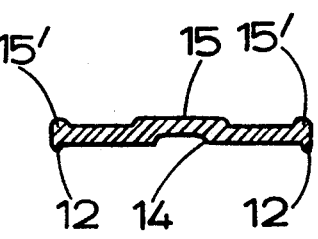
FIGS. 3 and 4 are respectively a plan view of the band and a section on line 4—4 of FIG. 2.
Figure 3:
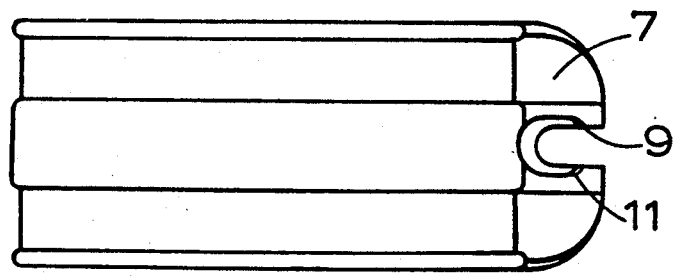

A shallow central annular channel 14, FIG. 4, is defined in the internal surface of the band. The external surface of the band has a raised annular portion 15 opposite the channel 14 and decorative circumferential beads 15' at its opposite ends.

The sealing gasket 4 is moulded from, for example, an ethylene/propylene rubber such as EPDM, or a nitrile or natural rubber, typically having a Shore Hardness value of 45–55. It has a body 16 in the form of a relatively thin-walled cylindrical sleeve, and two spaced integral wedge portion 17 projecting, in alignment with one another, radially from the external circumferential surface of the body 16 adjacent to the axially opposite ends of the body. The external circumferential surface of the body 16 is plain. Internally the body has an integral annular central rib 18, FIG. 7, of slightly inwardly tapering trapezoidal cross-section, and, spaced to either side of the central rib, annular sealing ribs 19, 20 of generally right-angled triangular cross-section the perpendicular sides of which face axially inwardly of the body. There are two of the sealing ribs 19, 20, one, 19, being at the end of the body and the other , 20, being at an intermediate position near to the end sealing rib 19. The axial length of the body is such as to fit into the band 3 between the retaining beads 12. The wedge portions 17 fit between the lugs 7, 8 of the band. Each tapers symmetrically to a small extent away from the band and has a squared outer end. Typically the flanks 21 of each wedge portion each have an inward inclination of about 5°. The flanks 21 merge at their inner ends into the external circumferential surface of the body at concavely arcuate curves 22 which engage with the convexly curved facing surfaces of the inner ends 7', 8' of the lugs 7, 8 but in the normal free state of the wedge portions the curves 22 have a smaller radius of curvature than that of the curved facing surfaces of the inner ends of the lugs. Facing faces 23 of the two wedge portions 17 incline away from one another towards the outer ends of the wedge portions. The thickness of each wedge formation annularly of the body is greater than the radial projection of the formation from the body, and at its root between the curves 22 corresponds to the annular spacing between the convexly curved facing surfaces of the inner ends 7', 8' of the lugs 7, 8 of the band 3 in the free uncontracted state of the band.

Instead of the two spaced wedge portions there may be just one wedge portion which extends for the axial length of the body.

The clamping bolt 5 is engaged in the slots 9, 10 of the lugs 7, 8, its head 24 engaging in the hollow 11 of the one lug 7 to restrain the bolt from turning. The retaining nut 6 is tightened on to the bolt 5 against the other lug 8. The bolt, with the nut loosely fitted to it, may be inserted sideways into the slots 9, 10. The outward divergence of the lugs assists in retaining the bolt head 22 and nut in secure engagement with them as the nut is tightened on the bolt.

For its application to pipes which are to be connected the coupling may have the band pre-assembled on the gasket and the clamping bolt and nut already loosely applied to the band. The wedge portions 17 occupy the space between the inner end portions of the lugs which lightly bear on the curves 22 of the flanks 21 of the wedge portions. The assembled coupling is fitted, with the band fully released, to the end of one of the pipes 2, the gasket being pushed on to the pipe until its central rib 18 abuts against the end edge of the pipe. The other pipe is then entered into the opposite end of the gasket and pushed into the gasket until it also abuts against the central rib 18. When that has been done the connection is completed by tightening the nut 6 on the clamping bolt 5 so that the band is contracted on to the gasket to a substantially true circular form, and the gasket is compressed around the pipes urging the sealing ribs 19, 20 into secure sealing contact with the external surfaces of the pipes. As the lugs 7, 8 are urged towards one another, by the tightening clamping bolt and nut, they grip and compress the wedge portions 17 which are thus trapped and prevent the portion of the body of the gasket adjacent to the lugs from bulging outwards between the lugs as the gasket is compressed. There is a radially inward urging of the wedge portions 17 relative to the body by the compressive forces applied to them by the lugs 7, 8 so that the compressing of the wedge portions in fact urges the adjacent region of the gasket onto the pipes. Complete circumferential security of the sealing contact of the sealing ribs 19, 20 with the pipes is therefore ensured. The nut can be tightened until the lugs engage with one another. As the lugs compress the wedge portions the curves 22 of the flanks 21 of the wedge portions conform to the convex curvature of the facing surfaces of the inner ends 7', 8' of the lugs.

By virtue of the fact that the band has just the one pair of lugs, the coupling can be fitted to the pipes such that, if desired, the lugs, and their clamping bolt 5 and nut 6, can be concealed from view, or substantially so, at the installation. For example, if the connected pipes are sections of a down pipe from roof guttering of a building, the band can be orientated such that the lugs are behind the down pipe where they are less noticeable.

I claim:

1. A pipe coupling for coupling together two pipes or conduits of a building, comprising a sealing gasket, a housing, a clamping bolt and retaining means with which said clamping bolt tightenably engages;

said sealing gasket being resiliently compressible and having a continuously annular, tubular body, which has a radial thickness, an external circumferential surface and axially opposite radial end faces and is adapted to be fitted in use as a sleeve over adjacent end portions of the two pipes or conduits to be connected end-to-end by the coupling, and a first wedge formation which projects radially outwardly rom said external circumferential surface and has opposed flanks presented circumferentially of said body, extending convergently away from said external circumferential surface and merging into said external circumferential surface at concavely flaring curves;

said housing being a unitary casting of ductile metal or alloy and being in the form of a band of substantially strip form which surrounds said sealing gasket, extends through almost a circle, has axially opposite ends and circumferential ends, is of a width between its said axially opposite ends and of a circumferential length between its said circumferential ends to contain and substantially encircle said annular body of said sealing gasket, has a free state in which it is of an oval shape and a fully circumferentially, resiliently contracted state of a substantially true circular form, has internal peripheral bead formations at its said axially opposite ends, which bead formations project radially inwardly by a distance which is less than the radial thickness of said sealing gasket body and cooperate and overlap with said axially opposite radial end faces of said annular body of said sealing gasket to locate and retain said body within the confines of said band, said bead formations being interrupted at an intermediate part of the circumferential length of said band diametrically opposite to said circumferential ends, thereby to allow flexing of said band about said intermediate part, has an internal circumferential recess intermediate and spaced from said peripheral bead formations, and has a pair of opposed, radially-outwardly directed lugs at said circumferential ends, said lugs enclosing a space for receiving said first wedge formation, said lugs having radially inner ends provided with facing surfaces convexly curved complementary to and engaging with said concavely flaring curves of said first wedge formation, said facing surfaces being spaced apart, when said band is in said free state, by a distance corresponding substantially to the thickness of said first wedge formation between said concavely flaring curves;

said clamping bolt being located with respect to and extending between said lugs, and said retaining means being at one of said lugs so that tightening of said clamping bolt and said retaining means causes said lugs to be urged towards one another and said band to be urged resiliently thereby towards said fully circumferentially contracted state, said gasket and said housing being constructed and arranged such that as said lugs are urged towards one another, said band is circumferentially contracted onto said sealing gasket, said sealing gasket is resiliently radially inwardly compressed, said lugs grip said wedge formation at said opposed flanks and cooperation of said convexly curved surfaces of said lugs with said concavely flaring curves of said wedge formation urges said gasket inwardly at said wedge formation thereby to restrain said body from bulging outwardly between said lugs while said band is so contracted.

2. A pipe coupling according to claim 1 wherein each said lug has a radially outer end and a slot which opens to said radially outer end, said clamping bolt is located in said slots of said lugs, and said retaining means comprises a nut which said clamping bolt screw-threadedly engages at one of said lugs.

3. A pipe coupling according to claim 2 wherein said clamping bolt has a non-circular head, the other one of said lugs has a recess formed in it adjacent to said slot therein, and said recess receives and mates with said heat to restrain said clamping bolt from turning relative to said other one of lugs while said nut is turned on said clamping bolt to tighten its engagement therewith.

4. A pipe coupling according to claim 1 wherein said gasket has an additional wedge formation spaced from and similar to said first wedge formation; said first wedge formation and said additional wedge formation are each disposed towards a respective axially opposite end of said body of said gasket and both of said wedge formations extend between said lugs; and said retaining means and said clamping bolt are located between said wedge formation and said additional wedge formation.

5. A pipe coupling according to claim 1 wherein said lugs have parts which make abutting contact with one another when said band is in said fully circumferentially contracted state.

* * * * *